UNITED STATES PATENT OFFICE.

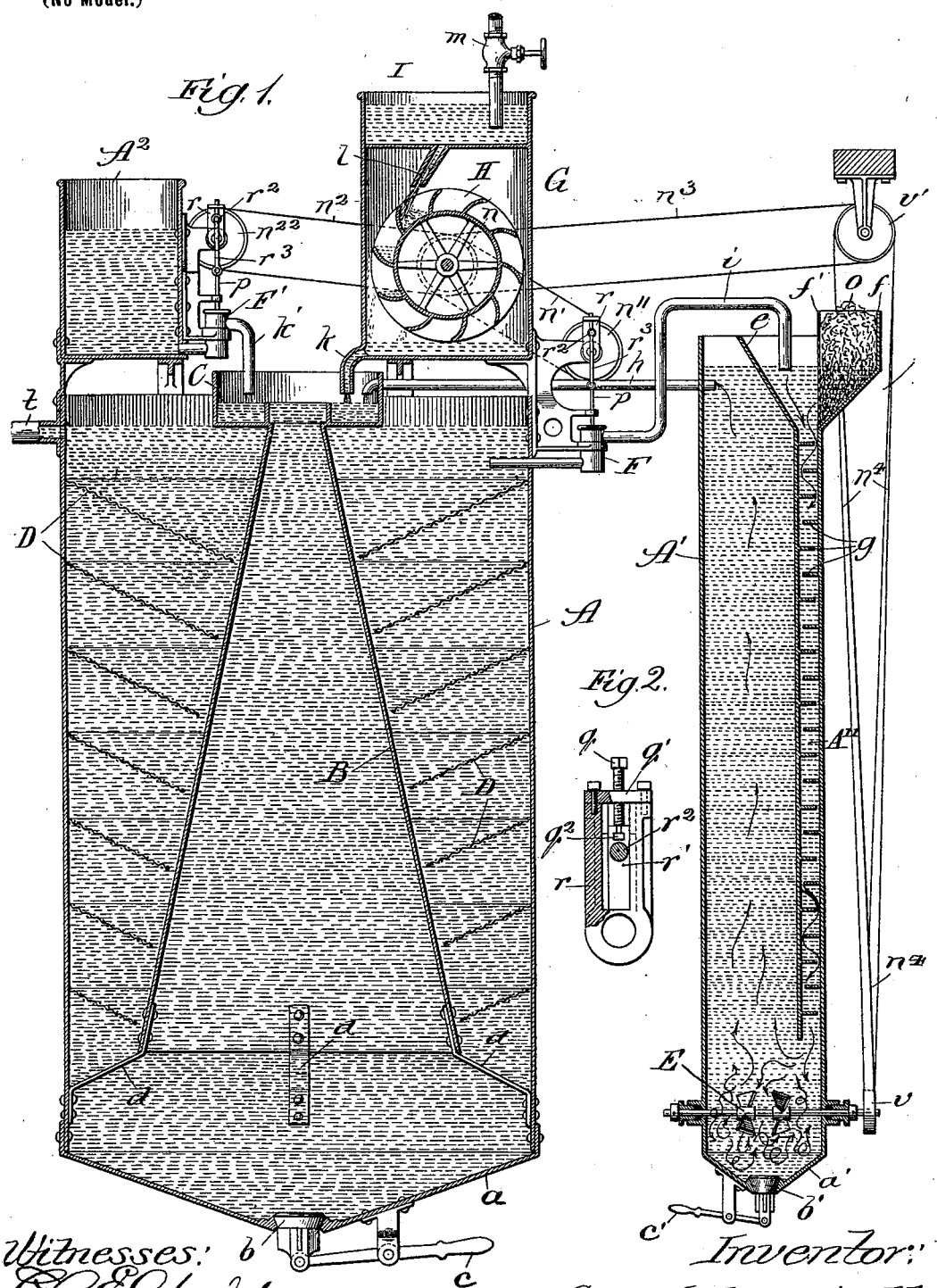

CASS L. KENNICOTT, OF CHICAGO, ILLINOIS, ASSIGNOR OF ONE-HALF TO C. J. BLAIR, OF SAME PLACE.

APPARATUS FOR PURIFYING WATER.

SPECIFICATION forming part of Letters Patent No. 646,108, dated March 27, 1900.

Application filed June 5, 1899. Serial No. 719,439. (No model.)

*To all whom it may concern:*

Be it known that I, CASS L. KENNICOTT, a citizen of the United States, residing at Chicago, in the county of Cook and State of Illinois, have invented a new and useful Improvement in Water-Purifying Apparatus, of which the following is a specification.

My invention relates to an improvement in apparatus for softening water, more particularly according to the well-known process by which the lime contained in the water is removed by precipitation, as by mixing with the water a solution of oxid of lime to change the soluble bicarbonate of lime in the water to carbonate of lime and by further mixing a soda solution (caustic or carbonate) with the water to be softened to change the sulphate of lime into hydrate of lime, which in turn acts on the bicarbonate of lime in the water, forming a precipitable carbonate of lime.

Among the more important objects of my improvement are to enhance the precipitation in the water of its contained impurities by providing a construction of the apparatus which shall tend to induce the precipitation with the downward current of the water flowing through the apparatus and to provide for automatically regulating the supply to the water to be treated of the precipitating agent or agents by and according to the supply of such water to the apparatus.

Referring to the accompanying drawings, Figure 1 shows my improved apparatus by a view in vertical sectional elevation; and Fig. 2 is an enlarged view in elevation, partly sectional, of means for adjusting the pump-stroke.

A is a tank having an overflow $t$ and provided, by preference, with a hopper-bottom $a$, having in its apex a sludge-draw-off opening closed by a valve $b$, provided with an operating-lever $c$ for unseating it. Within the tank which forms the precipitating-tank and concentric therewith is a downwardly-flaring conduit B, which should be of the same shape in cross-section as the tank, in which it is shown supported at its lower end by arms $d$, and a mixing-pan C is provided at the upper narrower end of the conduit. For a purpose hereinafter explained the area of the base of the conduit should at least approximately equal that of the annular space surrounding it, which is bounded by the tank-wall. Perforated annular diaphragms D D, preferably of the general funnel shape illustrated, are provided in series about the conduit B.

A' is a mixing-tank for an agent, as limewater, to be used in purifying water introduced for the purpose into the tank A. It is shown provided with a hopper-bottom $a'$, containing a draw-off opening closed by a valve $b'$, controlled by a lever $c'$, and as provided with a rotary stirring device E on a shaft journaled in the bottom portion of the tank and carrying on one end a pulley $v$. At the upper end of the mixing-tank is a hopper $e$, containing a pocket $f$, formed with a perforated wall $f'$, extending on one side of the hopper-base opening which leads to a preliminary mixing-chamber $A^{11}$ in and opening at its lower end into the tank A' and containing alternating and mutually-lapping series of baffle-plates $g$. A feed-pipe $h$ leads from the tank A' below the normal water-level therein into the mixing-pan C, and a pipe $i$ leads from the tank A below the normal water-level therein into the tank A' and has interposed in it a force-pump (indicated at F) of any known or suitable construction and represented as of the reciprocating-piston variety.

A power-chamber G is supported to extend over the tank A and discharges from its lower end, through a spout $k$, into the mixing-pan C. Within the chamber G is journaled a water-wheel H, that shown being of the overshot variety, driven by the fall of the water to be purified, through a spout $l$, from a reservoir I, formed in the upper end of the power-chamber and to which the water is supplied from any convenient source through a valve-controlled pipe $m$.

$A^2$ is a tank supported over the tank A for containing another agent, as a solution of soda, (caustic or carbonate,) for purifying the water to be treated. The tank $A^2$ discharges from its lower end into the mixing-pan C through a spout $k'$, having interposed in it a force-pump F', which may be like the pump F.

The pumps F and F' are respectively geared from pulleys $n^{11}$ and $n^{22}$ by belt connections $n'$ and $n^2$ each with a pulley $n$ on the shaft of the wheel H, which is also geared by a belt connection $n^3$ with a pulley $v'$, connected with the pulley $v$ on the stirrer-shaft by a belt $n^4$.

The operation is as follows: The proper solution, as of soda, is supplied to the tank $A^2$, and another purifying agent, as ordinary lime in lump form, (indicated at $o$,) is filled into the pocket $f$, in which water fed to the tank $A'$ may have access to it through the perforated wall $f'$ to dissolve it and become impregnated therewith to form lime-water. For starting, the tank A may be presumed to be filled with "raw" water or water to be purified and the tanks $A'$ and $A^2$ with their respective solutions. The raw-water supply from the reservoir I to the tank A should nearly equal the quantity extracted therefrom at the overflow $t$, and the wheel H actuates the pump $F'$ to supply to the pan C a regulated proportion of the solution from the tank $A^2$ and the pump F to supply to the tank $A'$ through the pipe $i$ a regulated proportion of the already-softened water from the tank A, the supply of each solution being thus governed by the amount of water passing over the wheel. These proportions supplied by the pumps may be conveniently regulated to suit any requirement for a particular water to be treated by adjusting the strokes of the pump-pistons. Means suitable for the purpose, but involving no feature of novelty, are shown in Fig. 2 and involve the following construction: On the axis of each pulley $n^{11}$ $n^{22}$ is fastened at one end a bifurcated arm $r$, having slidingly confined in it a head $r'$, from which projects the crank-pin $r^2$, connected by a link $r^3$ with the pump piston-rod $p$, and a set-screw $q$, which works through a cross-head $q'$, fastened on the end of the bifurcated arm, has a head $q^2$ on its inner end, rotatably confined in a recess in the head $r'$. By turning the set-screw to move the head $r'$ farther in or out with relation to the cross-head $q'$ the stroke of the pump-piston is varied accordingly. Mixing of the soda solution from the tank $A^2$ and the lime solution through the pipe $h$ from the tank $A'$ with the raw water from the reservoir I takes place in the pan C, changing the bi-carbonate of lime in the water to precipitable carbonate of lime and any soluble magnesia compounds that may be contained in the water to insoluble precipitable compounds. The mixture flows from the pan C through the conduit B, and owing to the increasing cross area thereof, due to its expansion in the downward direction, the rate of flow is accordingly decreased, thereby very materially enhancing the gravitation of the solid matters in their downward course, so that by the time the mixture reaches the bottom of the conduit it is almost entirely freed by precipitation of its contained impurities, and the remnant thereof settles out and is intercepted by the perforated plates D in the upward flow about the exterior of the conduit to the overflow $t$.

As will be observed, the supply of water for the lime solution made in the tank $A'$ is taken from the tank A through the pipe $i$, washes past the lime in the pocket $f$, and passes down over the baffle-plates $g$ to enhance the mixing, and the mixture is kept agitated by the stirrer E to aid in solution and prevent settling. Thus already purified or softened water is used for making the lime-water, instead of the raw or unpurified water. This affords a very material advantage in the way of economy, since the insoluble bi-carbonate of lime contained in unpurified water envelops the particles of lime it washes from the pocket $f$ and tends to prevent it from dissolving, thus necessitating taking up a larger proportion of lime for making the lime-water to give it the required strength, whereas, by using, for the lime-water, water taken from the purified contents of the tank, which are freed of bi-carbonate of lime, it readily dissolves the lime washed out of the pocket $f$ without waste of the nature of that ensuing from the use of raw water.

Owing to the corresponding areas of the base of the conduit B and annular space surrounding it there is no change in the rate of flow of the water from the conduit to the tank.

While lime and soda are herein specified as the precipitating agents, my invention is not intended to be limited thereto, as waters having different properties may require the use of other agents, which may be applied in accordance with my invention.

What I claim as new, and desire to secure by Letters Patent, is—

1. In a water-purifying apparatus, the combination with the precipitating-tank, of a downwardly-flaring downtake-conduit within the tank, said conduit having at its upper end an inlet for the water to be purified and its contained precipitating agent or agents.

2. In a water-purifying apparatus, the combination with the precipitating-tank, of a downwardly-flaring downtake-conduit within the tank, said conduit having at its upper end an inlet for the water to be purified and its contained precipitating agent or agents, the area of the base of said conduit being equal or approximately equal to that of the annular space in the tank about said base for the purpose set forth.

3. In a water-purifying apparatus, the combination with the precipitating-tank of a downwardly-flaring conduit supported therein and through which the water to be purified and its contained precipitating agent or agents flow into the tank, and a mixing-pan surmounting said conduit, substantially as and for the purpose set forth.

4. In a water-purifying apparatus, the combination with the precipitating-tank of a downwardly-flaring conduit supported therein and through which the water to be purified and its contained precipitating agent or agents flow into the tank, and a series of perforated annular diaphragms surrounding said conduit and extending across the upward course of the water in the tank, substantially as and for the purpose set forth.

5. In a water-purifying apparatus, the combination with the precipitating-tank, of a conduit within the tank, said conduit having at its upper end an inlet for the water to be purified and its contained precipitating agent or agents, a mixing-tank adjacent to the precipitating-tank, a mixture-conducting pipe leading from the mixing-tank to the inlet of the conduit, a water-conducting pipe leading from the upper end of the precipitating-tank to the mixing-tank, and a force-pump connected with the water-conducting pipe.

6. In a water-purifying apparatus, the combination with the precipitating-tank, of a downwardly-flaring downtake-conduit within the tank, said conduit having at its upper end an inlet for the water to be purified and its contained precipitating agent or agents, a motor adjacent to the tank said motor being driven by the water to be purified in its passage to the conduit-inlet, a precipitating-agent supplier and means actuated by the motor to regulate the supply of agent to the conduit-inlet.

7. In a water-purifying apparatus, the combination with the precipitating-tank containing a conduit through which the water to be purified and its contained precipitating agent or agents flow into the tank, of a mixing-tank, a mixing-pan surmounting said conduit, a mixture-conducting pipe leading from the mixing-tank into said pan, a power-chamber emptying into said pan and communicating with the supply of water to be purified, a water-wheel in said chamber, a water-conducting pipe leading from the mixing-tank into the precipitating-tank, and a force-pump connected with said water-conducting pipe and geared with said wheel to be actuated by it, substantially as and for the purpose set forth.

8. In a water-purifying apparatus, the combination with the precipitating-tank containing a conduit through which the water to be purified and its contained precipitating agents flow into the tank, of a mixing-tank A' communicating with said pan through a pipe $h$, a pipe $i$ leading from the precipitating-tank into said mixing-tank and containing a force-pump F, a mixing-tank $A^2$ having a discharge-spout emptying into said pan and containing a force-pump F', a power-chamber emptying into said pan and communicating with the supply of water to be purified, and a water-wheel in said chamber geared with said pumps to actuate them, substantially as and for the purpose set forth.

9. A water-purifying apparatus comprising, in combination, a tank A containing a downwardly-flaring conduit B surrounded by the diaphragms D and surmounted by a mixing-pan C, a mixing-chamber A' discharging into said pan through a pipe $h$, a pipe $i$ leading from the tank A into said mixing-tank and containing a pump F, a mixing-chamber $A^2$ discharging into said pan through a spout containing a pump F', a power-chamber G discharging into said pan and containing a reservoir I for the water to be purified, and a water-wheel H in said chamber, driven by the flow of water from said reservoir and geared with said pumps to actuate them, substantially as and for the purpose set forth.

10. In a water-purifying apparatus, the combination with the precipitating-tank, of a conduit within the tank, said conduit having at its upper end an inlet for the water to be purified and its contained precipitating agent or agents, a mixing-tank adjacent to the precipitating-tank, a mixture-conducting pipe leading from the mixing-tank to the conduit-inlet, a pipe leading from the upper end of the precipitating-tank to the mixing-tank to supply purified water to the latter, and means for controlling the purified-water supply.

CASS L. KENNICOTT.

In presence of—
R. T. SPENCER,
D. W. LEE.